(12) United States Patent
Jacobs, II et al.

(10) Patent No.: US 9,606,701 B1
(45) Date of Patent: Mar. 28, 2017

(54) AUTOMATED RECOMMENDED JOINING DATA WITH PRESENTED METHODS FOR JOINING IN COMPUTER-MODELED STRUCTURES

(71) Applicant: Benko, LLC, New London, NH (US)

(72) Inventors: James L. Jacobs, II, Amherst, NH (US); Steven M. Lynch, Hudson, NH (US)

(73) Assignee: Benko, LLC, New London, NH (US)

( * ) Notice: Subject to any disclaimer, the term of this patent is extended or adjusted under 35 U.S.C. 154(b) by 431 days.

(21) Appl. No.: 14/053,222

(22) Filed: Oct. 14, 2013

(51) Int. Cl.
G06F 3/0482 (2013.01)

(52) U.S. Cl.
CPC .................. *G06F 3/0482* (2013.01)

(58) Field of Classification Search
None
See application file for complete search history.

(56) References Cited

U.S. PATENT DOCUMENTS

| | | |
|---|---|---|
| 4,495,559 A | 1/1985 | Gelatt, Jr. et al. |
| 5,117,354 A | 5/1992 | Long |
| 5,465,221 A | 11/1995 | Merat et al. |
| 5,495,430 A | 2/1996 | Matsunari et al. |
| 5,552,995 A | 9/1996 | Sebastian |
| 5,570,291 A | 10/1996 | Dudle et al. |
| 5,655,087 A | 8/1997 | Hino et al. |
| 5,758,328 A | 5/1998 | Giovannoli |
| 5,847,971 A | 12/1998 | Ladner et al. |
| 5,870,719 A | 2/1999 | Maritzen et al. |
| 5,937,189 A | 8/1999 | Branson et al. |
| 6,031,535 A | 2/2000 | Barton |
| 6,112,133 A | 8/2000 | Fishman |

(Continued)

FOREIGN PATENT DOCUMENTS

| | | |
|---|---|---|
| WO | 0154476 A2 | 8/2001 |
| WO | 0171626 A2 | 9/2001 |

(Continued)

OTHER PUBLICATIONS

Wu et al. Interactive 3D Geometric Modelers with 2D UI, 2002, State University of Campinas, www.dca.fee.unicamp.br, Sao Paulo, Brazil; 2002, 8 pages.

(Continued)

*Primary Examiner* — Maryam Ipakchi
(74) *Attorney, Agent, or Firm* — Downs Rachlin Martin PLLC (57) ABSTRACT

A system that provides automated/semi-automated recommendations for joining one or more instantiations of a structure that is modeled in a computer model. The system receives input joining data from the computer model. The system uses the received input joining data to automatedly determine recommended joining data. In some embodiments, the system further includes functionality that allows a user select a recommended joining method, joining parameters, or other joining data. Such systems can be implemented in any of a wide variety of manners, such as within a single computing device or across a communications network, among others. In some embodiments, functionalities of the system are integrated into computer-modeling software directly of via add-on software.

14 Claims, 5 Drawing Sheets

(56) References Cited

U.S. PATENT DOCUMENTS

| | | |
|---|---|---|
| 6,295,513 B1 | 9/2001 | Thackston |
| 6,341,271 B1 | 1/2002 | Salvo et al. |
| 6,343,285 B1 | 1/2002 | Tanaka et al. |
| 6,611,725 B1 | 8/2003 | Harrison |
| 6,647,373 B1 | 11/2003 | Carlton-Foss |
| 6,701,200 B1 | 3/2004 | Lukis et al. |
| 6,750,864 B1 | 6/2004 | Anwar |
| 6,834,312 B2 | 12/2004 | Edwards et al. |
| 6,836,699 B2 | 12/2004 | Lukis et al. |
| 6,859,768 B1 | 2/2005 | Wakelam et al. |
| 6,917,847 B2 | 7/2005 | Littlejohn et al. |
| 6,922,701 B1 | 7/2005 | Ananian et al. |
| 7,006,084 B1 | 2/2006 | Buss et al. |
| 7,058,465 B2 | 6/2006 | Emori et al. |
| 7,079,990 B2 * | 7/2006 | Haller .............. G05B 19/41805 345/420 |
| 7,085,687 B2 | 8/2006 | Eckenwiler et al. |
| 7,089,082 B1 | 8/2006 | Lukis et al. |
| 7,123,986 B2 | 10/2006 | Lukis et al. |
| 7,134,096 B2 | 11/2006 | Brathwaite et al. |
| 7,299,101 B2 | 11/2007 | Lukis et al. |
| 7,305,367 B1 | 12/2007 | Hollis et al. |
| 7,327,869 B2 | 2/2008 | Boyer |
| 7,343,212 B1 | 3/2008 | Brearley et al. |
| 7,359,886 B2 | 4/2008 | Sakurai et al. |
| 7,366,643 B2 | 4/2008 | Verdura et al. |
| 7,369,970 B2 | 5/2008 | Shimizu et al. |
| 7,418,307 B2 | 8/2008 | Katircioglu |
| 7,467,074 B2 | 12/2008 | Faruque et al. |
| 7,496,487 B2 | 2/2009 | Wakelam et al. |
| 7,496,528 B2 | 2/2009 | Lukis et al. |
| 7,499,871 B1 | 3/2009 | McBrayer et al. |
| 7,523,411 B2 | 4/2009 | Carlin |
| 7,526,358 B2 | 4/2009 | Kawano et al. |
| 7,529,650 B2 | 5/2009 | Wakelam et al. |
| 7,565,139 B2 | 7/2009 | Neven, Sr. et al. |
| 7,565,223 B2 | 7/2009 | Moldenhauer et al. |
| 7,567,849 B1 | 7/2009 | Trammell et al. |
| 7,568,155 B1 | 7/2009 | Axe et al. |
| 7,571,166 B1 | 8/2009 | Davies et al. |
| 7,574,339 B2 | 8/2009 | Lukis et al. |
| 7,590,466 B2 | 9/2009 | Lukis et al. |
| 7,590,565 B2 | 9/2009 | Ward et al. |
| 7,603,191 B2 | 10/2009 | Gross |
| 7,606,628 B2 | 10/2009 | Azuma |
| 7,630,783 B2 | 12/2009 | Walls-Manning et al. |
| 7,656,402 B2 | 2/2010 | Abraham et al. |
| 7,689,936 B2 | 3/2010 | Rosel |
| 7,733,339 B2 | 6/2010 | Laning et al. |
| 7,747,469 B2 | 6/2010 | Hinman |
| 7,748,622 B2 | 7/2010 | Schon et al. |
| 7,761,319 B2 | 7/2010 | Gil et al. |
| 7,822,682 B2 | 10/2010 | Arnold et al. |
| 7,836,573 B2 | 11/2010 | Lukis et al. |
| 7,840,443 B2 | 11/2010 | Lukis et al. |
| 7,908,200 B2 | 3/2011 | Scott et al. |
| 7,957,830 B2 | 6/2011 | Lukis et al. |
| 7,979,313 B1 | 7/2011 | Baar |
| 7,993,140 B2 | 8/2011 | Sakezles |
| 8,000,987 B2 | 8/2011 | Hickey et al. |
| 8,024,207 B2 | 9/2011 | Ouimet |
| 8,140,401 B2 | 3/2012 | Lukis et al. |
| 8,170,946 B2 | 5/2012 | Blair et al. |
| 8,175,933 B2 | 5/2012 | Cook, Jr. et al. |
| 8,180,396 B2 | 5/2012 | Athsani et al. |
| 8,209,327 B2 | 6/2012 | Danish et al. |
| 8,239,284 B2 | 8/2012 | Lukis et al. |
| 8,249,329 B2 | 8/2012 | Silver |
| 8,271,118 B2 | 9/2012 | Pietsch et al. |
| 8,275,583 B2 | 9/2012 | Devarajan et al. |
| 8,295,971 B2 | 10/2012 | Krantz |
| 8,417,478 B2 | 4/2013 | Gintis et al. |
| 8,441,502 B2 | 5/2013 | Reghetti et al. |
| 8,515,820 B2 | 8/2013 | Lopez et al. |
| 8,554,250 B2 | 10/2013 | Linaker |
| 8,571,298 B2 | 10/2013 | McQueen et al. |
| 8,595,171 B2 | 11/2013 | Qu |
| 8,700,185 B2 | 4/2014 | Yucel et al. |
| 8,706,607 B2 | 4/2014 | Sheth et al. |
| 8,768,651 B2 | 7/2014 | Bhaskaran et al. |
| 8,798,324 B2 | 8/2014 | Conradt |
| 8,806,398 B2 | 8/2014 | Brathwaite et al. |
| 8,830,267 B2 | 9/2014 | Brackney |
| 8,849,636 B2 | 9/2014 | Becker et al. |
| 8,861,005 B2 | 10/2014 | Grosz |
| 8,874,413 B2 | 10/2014 | Mulligan et al. |
| 8,923,650 B2 | 12/2014 | Wexler |
| 8,977,558 B2 | 3/2015 | Nielsen et al. |
| 9,037,692 B2 | 5/2015 | Ferris |
| 9,055,120 B1 | 6/2015 | Firman |
| 9,106,764 B2 | 8/2015 | Chan et al. |
| 2001/0023418 A1 | 9/2001 | Suzuki et al. |
| 2001/0047251 A1 | 11/2001 | Kemp |
| 2002/0065790 A1 | 5/2002 | Oouchi |
| 2002/0087440 A1 | 7/2002 | Blair et al. |
| 2002/0099579 A1 | 7/2002 | Stowell et al. |
| 2002/0107673 A1 * | 8/2002 | Haller .............. G05B 19/41805 703/1 |
| 2002/0152133 A1 | 10/2002 | King et al. |
| 2003/0018490 A1 | 1/2003 | Magers et al. |
| 2003/0069824 A1 | 4/2003 | Menninger |
| 2003/0078846 A1 | 4/2003 | Burk et al. |
| 2003/0139995 A1 | 7/2003 | Farley |
| 2003/0149500 A1 | 8/2003 | Faruque et al. |
| 2003/0163212 A1 | 8/2003 | Smith et al. |
| 2003/0172008 A1 | 9/2003 | Hage et al. |
| 2003/0212610 A1 | 11/2003 | Duffy et al. |
| 2003/0220911 A1 | 11/2003 | Tompras et al. |
| 2004/0008876 A1 | 1/2004 | Lure et al. |
| 2004/0113945 A1 | 6/2004 | Park et al. |
| 2004/0195224 A1 | 10/2004 | Kanodia et al. |
| 2005/0055299 A1 | 3/2005 | Chambers et al. |
| 2005/0125092 A1 | 6/2005 | Lukis et al. |
| 2005/0144033 A1 | 6/2005 | Vreeke et al. |
| 2005/0171790 A1 | 8/2005 | Blackmon |
| 2005/0251478 A1 | 11/2005 | Yanavi |
| 2005/0273401 A1 | 12/2005 | Yeh et al. |
| 2006/0085322 A1 | 4/2006 | Crookshanks |
| 2006/0185275 A1 | 8/2006 | Yatt |
| 2006/0253214 A1 | 11/2006 | Gross |
| 2007/0016437 A1 | 1/2007 | Elmufdi et al. |
| 2007/0067146 A1 | 3/2007 | Devarajan et al. |
| 2007/0073593 A1 | 3/2007 | Perry et al. |
| 2007/0112635 A1 | 5/2007 | Loncaric |
| 2007/0198231 A1 | 8/2007 | Walch |
| 2008/0120086 A1 | 5/2008 | Lilley et al. |
| 2008/0183614 A1 | 7/2008 | Gujral et al. |
| 2008/0269942 A1 | 10/2008 | Free |
| 2008/0281678 A1 | 11/2008 | Keuls et al. |
| 2009/0058860 A1 | 3/2009 | Fong et al. |
| 2009/0208773 A1 | 8/2009 | DuPont |
| 2009/0299799 A1 | 12/2009 | Racho et al. |
| 2009/0319388 A1 | 12/2009 | Yuan et al. |
| 2011/0040542 A1 | 2/2011 | Sendhoff et al. |
| 2011/0047140 A1 | 2/2011 | Free |
| 2011/0209081 A1 | 8/2011 | Chen et al. |
| 2011/0213757 A1 | 9/2011 | Bhaskaran et al. |
| 2012/0016678 A1 | 1/2012 | Gruber et al. |
| 2012/0072299 A1 | 3/2012 | Sampsell |
| 2012/0230548 A1 | 9/2012 | Calman et al. |
| 2012/0316667 A1 | 12/2012 | Hartloff |
| 2013/0055126 A1 | 2/2013 | Jackson |
| 2013/0097259 A1 | 4/2013 | Li |
| 2013/0100128 A1 | 4/2013 | Steedly et al. |
| 2013/0138529 A1 | 5/2013 | Hou |
| 2013/0144566 A1 | 6/2013 | De Biswas |
| 2013/0166470 A1 | 6/2013 | Grala et al. |
| 2013/0218961 A1 * | 8/2013 | Ho ........................ G06Q 30/02 709/204 |
| 2013/0293580 A1 | 11/2013 | Spivack |
| 2013/0297320 A1 | 11/2013 | Buser |
| 2013/0297460 A1 | 11/2013 | Spivack |
| 2013/0311914 A1 | 11/2013 | Daily |
| 2013/0325410 A1 | 12/2013 | Jung et al. |

(56) References Cited

U.S. PATENT DOCUMENTS

| | | |
|---|---|---|
| 2014/0042136 A1 | 2/2014 | Daniel et al. |
| 2014/0067333 A1 | 3/2014 | Rodney et al. |
| 2014/0075342 A1 | 3/2014 | Corlett |
| 2014/0098094 A1 | 4/2014 | Neumann et al. |
| 2014/0157579 A1 | 6/2014 | Chhabra et al. |
| 2014/0207605 A1 | 7/2014 | Allin et al. |
| 2014/0229316 A1 | 8/2014 | Brandon |
| 2014/0279177 A1 | 9/2014 | Stump |
| 2014/0379119 A1 | 12/2014 | Sciacchitano et al. |
| 2015/0055085 A1 | 2/2015 | Fonte et al. |
| 2015/0066189 A1 | 3/2015 | Mulligan et al. |
| 2015/0127480 A1 | 5/2015 | Herrman et al. |
| 2015/0234377 A1 | 8/2015 | Mizikovsky |

FOREIGN PATENT DOCUMENTS

| | | |
|---|---|---|
| WO | 0177781 A2 | 10/2001 |
| WO | 2006086332 A2 | 8/2006 |
| WO | 2007067248 A2 | 6/2007 |
| WO | 2011139630 A1 | 11/2011 |
| WO | 2011140646 | 11/2011 |
| WO | 2011140646 A1 | 11/2011 |
| WO | 2013058764 A1 | 4/2013 |
| WO | 2014152396 A2 | 9/2014 |

OTHER PUBLICATIONS

"Upload Your Photos, Print a 3D Model with hypr3D." SolidSmack. http://www.solidsmack.com/cad-design-news/hypr3d-photo-video-3d-print/; last accessed on Oct. 13, 2015.

Rothganger et al. "3D Object Modeling and Recognition from Photographs and Image Sequences." Toward Category-Level Object Recognition. 2006, pp. 105-126, vol. 4170 of the series Lecture Notes in Computer Science. Springer Berlin Heidelberg.

Retrieved from:http://www.solidworks.com/sw/products/3d-cad/manufacturing-cost-estimation-quoting.htm p. 1: Automatic Manufacturing Cost Estimation Overview; Solidworks; 2015.

Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 2008.

http://citeseerx.ist.psu.edu/viewdoc/download?doi=10.1.1.194. 77858trep=rep1&type=pdf Kim, Jin Baek, and Arie Segev. "A web services-enabled marketplace architecture for negotiation process management." Decision Support Systems 40.1 (2005): 71-87.

Jaiswal, Ashutosh et al., "Design and Implementation of a Secure Multi-Agent Marketplace", Elsevier Science, pp. 1-23, Jun. 3, 2004; http://magnet.cs.umn.edu/papers/Jaiswal04cera.pdf.

http://www.bridgelinedigital.com/File%20Library/Repository/eCommerce/Sample-eCommerce-RFP-Template_Bridgeline-Digital.pdf. Sample RFP Template: Ecommerce Platform, Bridgeline Digital, 2014.

Matchbook, Tealbook, http://www.matchbookinc.com/ Sep. 28, 2015.

3Diligent, Source Smarter, http://www.3diligent.com/customer.html; Sep. 28, 2015.

Dassault Systemes, Brochure, Mar. 24, 2010: New Features Type3ToCatia http://www.type3.us/content/download/2202/405535/file/New%20Feature_Type3ToCatia_2010_US%20old.pdf.

Xue, S., X. Y. Kou, and S. T. Tan. "Natural voice-enabled CAD: modeling via natural discourse." Computer-Aided Design and Applicarrons 6.1 (2009): 125-136.

Kou, X. Y., S. K. Xue, and S. T. Tan. "Knowledge-guided inference for voice-enabled CAD." Computer-Aided Design 42.6 (2010): 545-557.

Sharma, Anirudh, et al. "MozArt: a multimodal interface for conceptual 3D modeling." Proceedings of the 13th international conference on multimodal interfaces. ACM, 2011.

U.S. Appl. No. 14/267,447, Aug. 5, 2015, Office Action.
U.S. Appl. No. 14/197,922, Nov. 26, 2014, Office Action.
U.S. Appl. No. 14/197,922, Apr. 27, 2015, Response to Office Action.
U.S. Appl. No. 14/197,922, May 15, 2015, Office Action.
U.S. Appl. No. 14/267,447, Jun. 18, 2015, Response to Office Action.
U.S. Appl. No. 14/263,665, Oct. 8, 2015, Office Action.
U.S. Appl. No. 14/053,222, Jan. 29, 2016, Office Action.
U.S. Appl. No. 14/311,943, Apr. 27, 2016, Office Action.
U.S. Appl. No. 14/486,550, May 26, 2016, Office Action.
U.S. Appl. No. 14/060,033, Jun. 15, 2016, Office Action.
U.S. Appl. No. 14/172,462, Jul. 6, 2016, Office Action.
U.S. Appl. No. 14/053,222, Jul. 29, 2016, Response to Office Action.
U.S. Appl. No. 14/185,204, Jul. 29, 2016, Office Action.
U.S. Appl. No. 14/062,947, Sep. 16, 2016, Office Action.
U.S. Appl. No. 14/060,033, filed Oct. 22, 2013.
U.S. Appl. No. 14/053,222, filed Oct. 14, 2013.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.
U.S. Appl. No. 14/303,372, filed Jun. 12, 2014.
U.S. Appl. No. 14/185,204, filed Feb. 20, 2014.
U.S. Appl. No. 14/195,391, filed Mar. 3, 2014.
U.S. Appl. No. 14/246,254, filed Apr. 7, 2014.
U.S. Appl. No. 14/229,008, filed Mar. 28, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

FIG. 5

AUTOMATED RECOMMENDED JOINING DATA WITH PRESENTED METHODS FOR JOINING IN COMPUTER-MODELED STRUCTURES

FIELD OF THE INVENTION

The present invention generally relates to the field of computer-aided design and structure fabrication. In particular, the present invention is directed to automated joining data recommending and presenting methods for computer-modeled structures.

BACKGROUND

Technical specifications and engineering drawings typically convey a variety of information about a to-be-fabricated structure, such as a part or an assembly of components. Examples of such information includes information about geometry, materials, finishes, connections, hardware, special processes, dimensions, tolerances, and others things as known in the art. The documents are prepared by engineers; however, manufacturers rely on the documents for manufacturing preparation to build the desired structure, such as a part or an assembly of multiple components. There are differing skill levels involved on both the engineering side and the manufacturing side, which has led to a gap between the two stages involved in fabricating a structure.

For the joining of structures, an engineer communicates desired techniques and parameters to the manufacturer using complex symbols (e.g., American National Standards Institute, or ANSI, symbols). The manufacturer must understand the meaning of these symbols, which may be prone to error and require interpretation skill and/or time. The manufacturer also verifies that the structure can be fabricated using the engineer's specified joining technique. If the manufacturer identifies a potential issue or an opportunity to improve the engineer's design, the manufacturer must contact the engineer directly, which is time consuming and inefficient.

SUMMARY OF THE DISCLOSURE

In an implementation, the present disclosure is directed to a method of assisting a user in selecting a join for a structure represented in a computer model. The method includes receiving via a join-recommending system a join request; receiving via the join-recommending system input joining data; executing, within the join-recommending system and in response to the receiving the join request, a joining recommendation algorithm that determines recommended joining data as a function of the input joining data; presenting the recommended joining data to the user via a join-recommendation user interface; receiving via the join-recommendation user interface a user selection of the recommended joining data so as to create selected joining data; and automatedly associating the selected joining data with the computer model.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present invention include software tools and techniques for automatically recommending and presenting joining data and methods for joining in one or more instantiations of a structure that is represented in a computer model through the use of a join-recommendation user interface. Using various ones of these tools and techniques, precise joining features and other joining data extracted from the computer model can be used along with joining parameters, as well as input joining data from an input-joining-data user interface, to create highly precise and highly repeatable joining recommendations to be presented to a user. Other aspects of the present invention include software tools and techniques for allowing a user to optionally share or send the presented recommendations to another. Still other aspects of the present invention include software tools and techniques to optionally allow a user to select a joining method from the presented recommendations through a join-recommendation user interface which may be associated with the computer model in any of various ways (e.g. through the use of a feature tree or by visually displaying the selected joining data on the computer model). These and other aspects of the present invention will become readily apparent upon reviewing this entire disclosure. Before proceeding with describing numerous aspects of the present invention in detail, a number of definitions of certain terms used throughout this disclosure are first presented. These terms shall have the following meanings throughout unless noted otherwise. Like terms, such as differing parts of speech, differing tenses, singulars, plurals, etc., for the same term (e.g., fabricating, fabricate, fabrication, fabrications, fabricated) shall have commensurate meanings.

Structure: A "structure" can be any physical thing that can be made by or under the control of a human and/or under the control of one or more machines. For example, a "structure" can be made by hand, using one or more tools, using one or more pieces of machinery, or any combination thereof. Examples of structures include, but are not limited to objects, parts, assemblies of components, buildings, vehicles, machines, semiconductor devices, computing devices, and electronic equipment, among many others. Fundamentally, there is no limitation on what a "structure" can be other than that it is fabricated.

Fabricate: To "fabricate" a structure is perform a step or collection of steps needed to physically instantiate the structure. In this context, fabrication includes, but is not limited to steps of cutting, machining, milling, turning, making connections, molding, in particular injection molded parts, casting, stamping, forming, bending, etching, drilling, etc. Synonyms that fall within the meaning of "fabricate" herein include, but are not limited to manufacture, erect, assemble, mold, and form, among many others.

Computer model: A "computer model" is a virtual, for example, digital, model of a physical structure as created using appropriate computer-modeling software, such as SolidWorks (available from Dassault Systèmes SolidWorks Corp, Waltham, Mass.), AutoCAD (available from Autodesk, Inc., San Rafael, Calif.), and MicroStation (available from Bentley Systems, Inc., Exton, Pa.), among many others. A "computer model" can be of any type, such as a wireframe or solid model, among others, or any combination thereof, and can be saved in a computer file using any suitable file protocol, such as .SLDPRT, .SLDASM, .STP, .IGS, a .DWG, .DXF, .DGN, etc. A "computer model" includes information about the geometry and/or other properties of the modeled structure.

Joining: A "joining" is a means that attaches portions of a structure or structures together in such a way as to ensure that the overall structure is structurally sound (e.g., strong enough to resist and withstand the force loads expected of it). A joining can be made by hand, using one or more tools, using one or more pieces of machinery, or any combination thereof. Joining can be fully automated (e.g., robotic) or involve varying degrees of human input. Examples of joinings include, but are not limited to seam welds, stitch welds, spot welds, rivets, nails, screws, nuts and bolts, adhesives, fuses, among many others. Fundamentally, there is no limitation on what "joining" can mean other than that it attaches portions of a structure or structures to one another.

Input joining data: "Input joining data" are input data to a system of the present disclosure that may be extracted from a computer model and that influence the recommended joining data of the structure(s) represented by the computer model. It is noted that input joining data may be either "extracted" or "non-extracted." The process of extracting joining data from a computer model is more one of scraping than extraction, because the input joining data is not removed from the computer model (which would destroy its integrity) but rather scraped, i.e., copied from the computer model and processed as needed for use in the system. "Non-extracted input joining data" can be input or received in any suitable manner, such as via a input-joining-data user interface or a non-computer-model electronic document, such as a form-fillable portable document format (PDF) document, or a non-computer-model data file, among others. Examples of "input joining data" include, but are not limited to, geometry (such as size, shape, dimensions, areas, configurations, numbers of components and other features, such as openings, recesses, bosses, etc.), type(s) of material (in computer models wherein materials can be specified), connection type(s) and features (in computer models wherein such information can be specified, finish type(s) (in computer models wherein finishes can be specified), among others. Fundamentally, there is no limitation on the data that can constitute "input joining data," other than that they influence the recommended joining data of the structure(s) and, therefore, selected joining data.

Recommended joining data: "Recommended joining data" are output data from a system of the present disclosure that are determined by a joining recommendation algorithm based on at least a portion of a computer model of at least a portion of a structure. Recommended joining data may be presented to the user via a join-recommendation user interface. For example, recommended joining data may include a specific type of joining, one or more joining characteristics for a joining, quantitative parameter values for a joining, or qualitative parameter values for a joining.

Joining characteristic: A "joining characteristic" includes any quantitative and/or qualitative data that conveys manufacturing specific knowledge about joining to a user. For example, a joining characteristic may be a minimum material thickness, a maximum material thickness, compatibility information for material types, strength of a joint, a cosmetic descriptor of a join, joining time per edge length segment, heat distortion factors per edge length measurement, tolerance adjustments per edge length segment, or a cost to be incurred by the user for the join, among others. Fundamentally, there is no limitation on the data that can constitute "joining characteristic," other than that data conveys manufacturing specific knowledge about joining.

Figure 1:
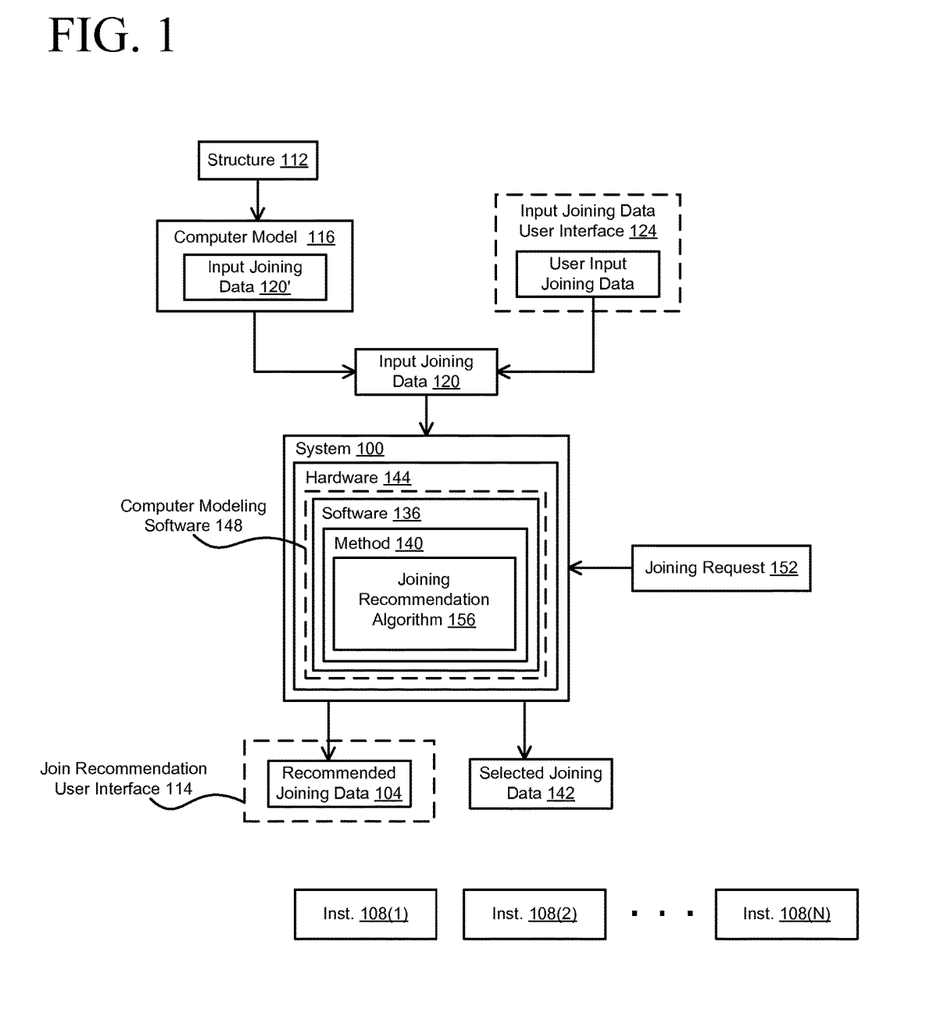
FIG. 1 is a high-level block diagram of a joining data determining and selecting system made in accordance with the present disclosure.
Figure 2:
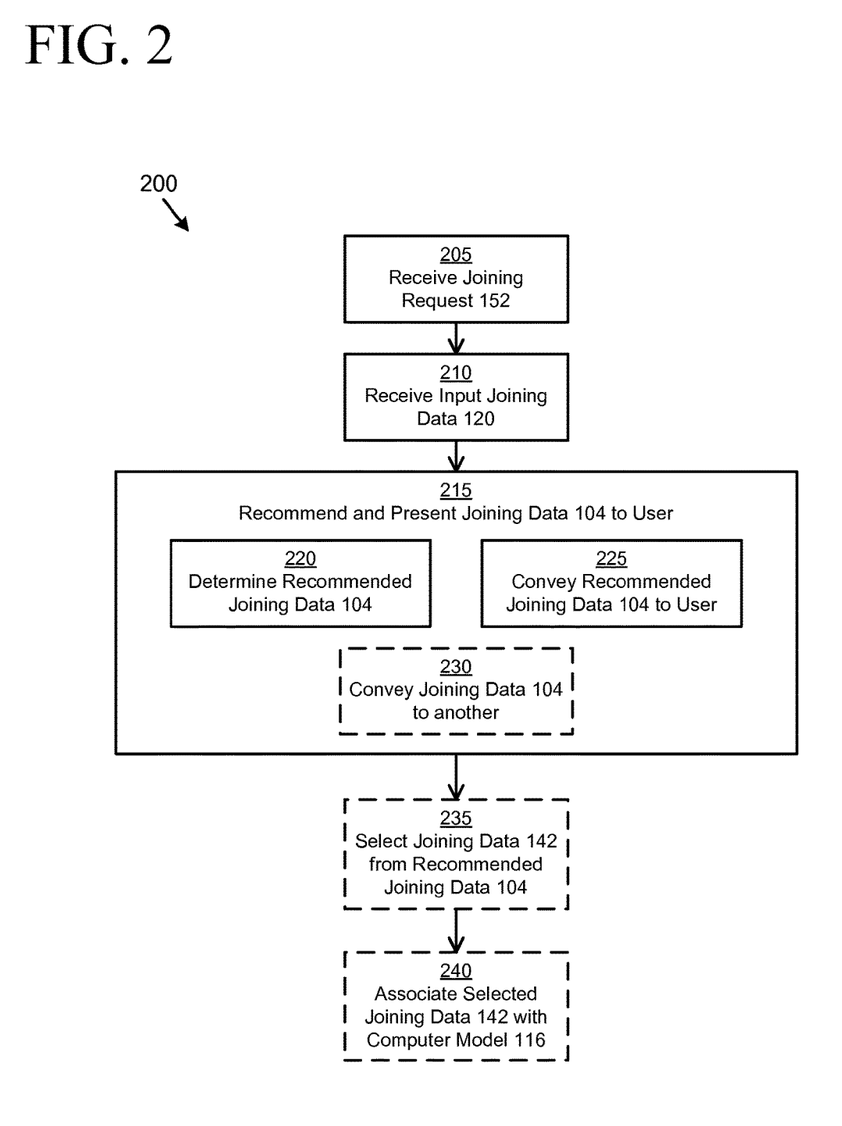
FIG. 2 is a flow diagram illustrating a method of determining and conveying joining data to a user and allowing the user to select joining data based on the presented method(s) that can be implemented by the joining data determining and selecting system of FIG. 1.

With the foregoing terms and meanings in mind, reference is now made to FIG. 1, which illustrates a join-recommending system 100 that assists a user (not shown) by presenting recommended joining data 104 for creating one or more instantiations 108(1) to 108(N) by joining portions of structure(s) 112 with one another via a join-recommendation user interface 114. Said structure(s) 112 are represented by computer model 116. As described below in more detail, join-recommending system 100 determines recommended joining data 104 based on input joining data 120 (e.g., input joining data 120' associated with a computer model 116 and/or input joining data not obtained from the computer model, such as input joining data input by a user via an input-joining-data user interface 124 which includes user-input joining data, as part of the recommendation process). As will become readily apparent from reading this entire disclosure, join-recommending system 100 includes software 136 for performing a method 140 of determining and conveying recommended joining data 104 and, optionally, allowing a user to determine selected joining data 142 to associate with the structure 112. FIG. 2 illustrates a joining data recommendation, presentation, and association method 200 that is suitable for use as method 140 of FIG. 1. Method 200 is described below in detail. However, before describing method 200 and with continuing reference to FIG. 1, join-recommending system 100 also includes suitable hardware 144 for executing software 136. In this context, hardware 144 includes all of the corresponding requisite functionality of the physical devices themselves. As those skilled in the art will readily appreciate from reading this entire disclosure, method 140 can be implemented in any suitable computer-based environment, such as in a network of computing devices or in a single computing device. Thus, hardware 144 can include a broad range of computing devices.

Examples of hardware 144 that can be used to implement the various steps of method 140 include, but are not limited to, web servers, desktop computers, laptop computers, tablet computers, smartphones, and Internet appliances, wearable computer (such as a GOOGLE GLASS™ computing device), among others. A network of two or more of such devices can include any one or more types of networks, including, but not limited to, a global communications network (such as the Internet), a wide-area network, a local-area network, and a telecommunications network, among others. In this connection, those skilled in the art will also recognize the myriad of ways that the steps of method 140 can be implemented across a network. For example, if any steps of method 140 are implemented on one or more web-servers, they may be performed by suitable software residing on, provided by, and/or executed by such server(s). Such software can include a software application, a software module (such as a plugin to another software application, such as a computer modeling application, web browser, etc.), and/or a software code segment. In many cases, the same or similar software, or any portion thereof, can be implemented on a desktop computer, a laptop computer, and a tablet computer. As another example, various steps of method 140 can be performed by one or more mobile apps running, on, for example, a smartphone or tablet computer, and provided the ability to communicate with one or more other computing devices running software that performs one or more other steps of the method.

In a particular embodiment, all steps of method 140 can be performed by a single computing device, such as a desktop computer or a webserver accessible via a browser, running an integrated software application that performs all steps of method 140 and that may also include computer-modeling functionality as well, such as a computer-modeling software application 148. In another embodiment, some steps of method 140 can be performed on a first computing device, whereas other steps of the method are performed on a second computing device located remotely from the first computing device across a network. Those skilled in the art will understand how to implement any variation reasonably conceivable using only known programming techniques and this disclosure as a guide. Consequently, it is not necessary to describe every potential variation for skilled artisans to practice the present invention to the fullest scope accorded by the appended claims. Regardless of the type of hardware 144 used to implement software 136 made in accordance with the present invention, the hardware works in combination with and under the control of such software to form join-recommending system 100, which provides functionality described herein.

Referring now to FIG. 2, and also to FIG. 1 for context and noting that 100-series element numerals correspond to FIG. 1 and 200-series numerals correspond to FIG. 2, at step 205 of method 200 a joining request 152 may be received by software 136 from a user. As noted above, request 152 is for recommended joining data 104 for joining one or more instantiations 108(1) to 108(N) of a structure 112 represented by a computer model 116. Software 136 can receive request 152 in any suitable manner, such as via a user interface (not shown) presented to a user on a computing device accessible to the user. In this example, software 136 may present a user-selectable soft control (not shown), such as a soft button or checkbox, that a user can select to make the request. As those skilled in the art will readily appreciate, the selection of the soft control can be effected in any suitable manner, such as by clicking on or otherwise selecting the control using a pointing device (e.g., a mouse) or by touching a touchscreen at the appropriate location to make the selection. The manner of selection will depend on the particular hardware 144 and configuration of software 136 being used on the user's computing device. As alluded to above, the user interface containing the user-selectable control can be provided application-specific software running on the user's device or a web-browser or other remote-access means that allows the user to access joining software functionality remotely from the user's device. As another example, request 152 may be a more passive request, such as the user opening an application (not shown) of software 136 that provide a user interface for joining recommendation and/or selection tasks; once the user opens the application, software 136 may initiate various ones of its joining recommendation and/or selection functionalities. As yet a further example, request 152 may be non-user initiated, such as join-recommending system 100 detecting a candidate joining location in structure 112 represented by computer model 116.

At step 210, in conjunction with the user making joining request 152, software 136 receives input joining data 120. As described above, input joining data 120 can be any data that a joining recommendation algorithm 156 of software 136 needs for determining recommended joining data 104. Those skilled in the art will understand that input joining data 120' can be determined in a variety of ways. In one example embodiment, joining data 120' may be inputted manually by the user through any of a variety of means (e.g. a text entry dialogue box or prompt, a drop-down selection menu and/or a bulleted or button selection, among others). In another exemplary embodiment, joining data 120' may be extracted from computer model 116 automatically in any of a variety of ways. For example, if data-extraction code is built into computer-modeling software, such as computer-modeling software application 148, the data-extraction code may be preprogramed to recognize input joining data 120' within computer model 116 and utilize the internal protocols of that application to gather the that data. As another example, if the data-extraction code is implemented as an external plugin module to computer-modeling software, the code might utilize the application's plugin module protocols. As yet another example, if the data-extraction code is executed externally from the computer-modeling application but not as a plugin, the external code may utilize an application programming interface of the application. Regardless of how software 136 and the data-extraction code are configured, those skilled in the art will readily understand how to design the code.

Alternatively, input joining data 120 may comprise input joining data, which can be received in any of a variety of ways, depending on how software 136 is configured in a particular instantiation. For example, software 136 may be configured to allow a user to input joining data via the input-joining-data user interface 124 that includes one or more data-input features of one or more differing types, such as, but not necessarily limited to, keyed-input fields, drop-down menus, radio-control selectors, hyperlinks, and other selectors, among others. Those skilled in the art will readily appreciate that the type(s) and number of data-input features can depend on the robustness of computer model 116 relative to input joining data 120' that it contains and the variety of options available from a particular fabricator. Regarding the former, as noted above, if a version of computer model 116 includes input joining data 120' such as material type(s), then the input-joining-data user interface 124 does not necessarily need a data-input feature directed to the material type(s), since that information will be extracted from the computer model. However, for a version of computer model 116 that does not allow the user to specify materials within the computer modeling software 148, therefore prohibiting the extraction of such data, the input-joining-data user interface 124 would need one or more data-input features to allow the user to input the appropriate material(s) needed for recommending joining method(s). Of course, material type is but one example of a joining-data type that can be of either an extracted type or a non-extracted type, and other joining data that can be of either type can be handled similarly.

The input-joining-data user interface 124 of the present disclosure can be implemented in any of a number of ways. For example, if the input-joining-data software code is implemented within computer-modeling software, such as computer-modeling software application 148, then the user interface (not shown) may be presented as a graphical user interface of the software application. Similarly, if the input-joining-data software code is executed in a plug-in-type external module, then the user interface may be presented in the same manner. It is noted that such computer-modeling software can be of the type that presents its graphical user interface via an on-screen window under the control of the operating system of the computer on which the application is implemented. However, in other embodiments, the graphical user interface can be presented in another way (via a web-browser, for example) when the computer-modeling software application 148 includes the input-joining-data software code and is implemented over the World-Wide Web, perhaps in a software-as-a-service implementation, among others, or when the input-joining-data software code is implemented separately from the computer-modeling software application. Regardless of how the input-joining-data software code is implemented for receiving joining data, skilled artisans will be able to create the appropriate software code.

At step 215, software 136 determines and presents recommended joining data 104 to a user via a join-recommendation user interface 114. Depending on the configuration of software 136 and where the various software components of the joining recommendation portion of the software are physically executed, step 215 will typically include several substeps. For example, at substep 220, joining recommendation algorithm 156 may determine recommended joining data 104 by, for example, utilizing input joining data 120. The precise joining recommendation algorithm 156 used in a particular embodiment will be highly dependent on, for example, the type(s) of structure(s) 112 handled by software 136, as well as the particularities of the fabricator(s) needed to fabricate the instantiation(s). Algorithm 156 may, in one embodiment, function in the form of a decision tree. This decision tree structure may function through a series of branching decisions, the outcomes of which may be determined by the available input joining data 120. This algorithm results in recommended joining data 104 being presented to the user. Joining recommendation algorithm 156 makes these recommendations by analyzing the geometry of the selected features and/or the surrounding features and comparing this geometrical data to known parameters and limitations for various joining methods and techniques.

Step 215 may also include a substep 225 at which software 136 conveys recommended joining data 104 to the user. These recommendations may be presented to the user in any one or more of a variety of ways. For example, recommended joining data 104 can be displayed on a display screen (not shown) of the user's computer, conveyed in an email, and/or provided in some other type of message, including regular mail, an instant message, a text message, etc. and/or as an attachment thereto, among others. Illustrative embodiments of this display screen will further be shown in FIG. 3 and FIG. 4. Fundamentally, there are no limitations on how recommended joining data can be conveyed to a user.

Step 215 may further include an optional substep 230 at which software 136 conveys recommended joining data 104 to an entity other than the user. For example, software 136 may transmit recommended joining data to others wishing to collaborate on the design of structure 112 (e.g., user's manager, design project team members, etc.). As another example, software 136 may transmit recommended joining data 104 and input joining data 120 to one or more fabricator(s) for purposes of data collection. As yet another example, software 136 may transmit recommended joining data and input joining data 120 to a social media system (not shown). Fundamentally, there are no limitations on how recommended joining data can be conveyed to other entities.

At optional step 235, the user determines the selected joining data 142 to associate with the computer model 116 of the structure 112 from the recommended joining data 104 presented via a join-recommendation user interface 114. For example, selected joining data 142 can be chosen from a display screen (not shown) of the user's computer, conveyed in an email, and/or provided in some other type of message. Step 235 may involve an iterative process in which the user is provided additional information about recommended joining data 104 before determining the selected joining data 142. Step 235 may involve the user specifying additional input information (e.g., parameter values) required for the selected joining data 142 to be associated with the computer model 116 via the input-joining-data user interface 124.

At optional step 240, in response to receiving the selected joining data 142, software 136 associates the selected joining data 142 with the computer model 116 of the structure 112. For example, software 136 may append information about the selected joining data 142 to the computer model 116, create a data link between information about the selected joining data 142 and the computer model 116, and/or display a visual representation of the selected joining data 142 with a visual representation of the computer model 116.

It is particularly emphasized that the order of performance of the foregoing steps of method 200 need not be as shown. Rather, they may be implemented in any logical order that results in determining and conveying recommended joining data.

Exemplary Embodiments for Conveying Recommended Joining Data

Figure 3:
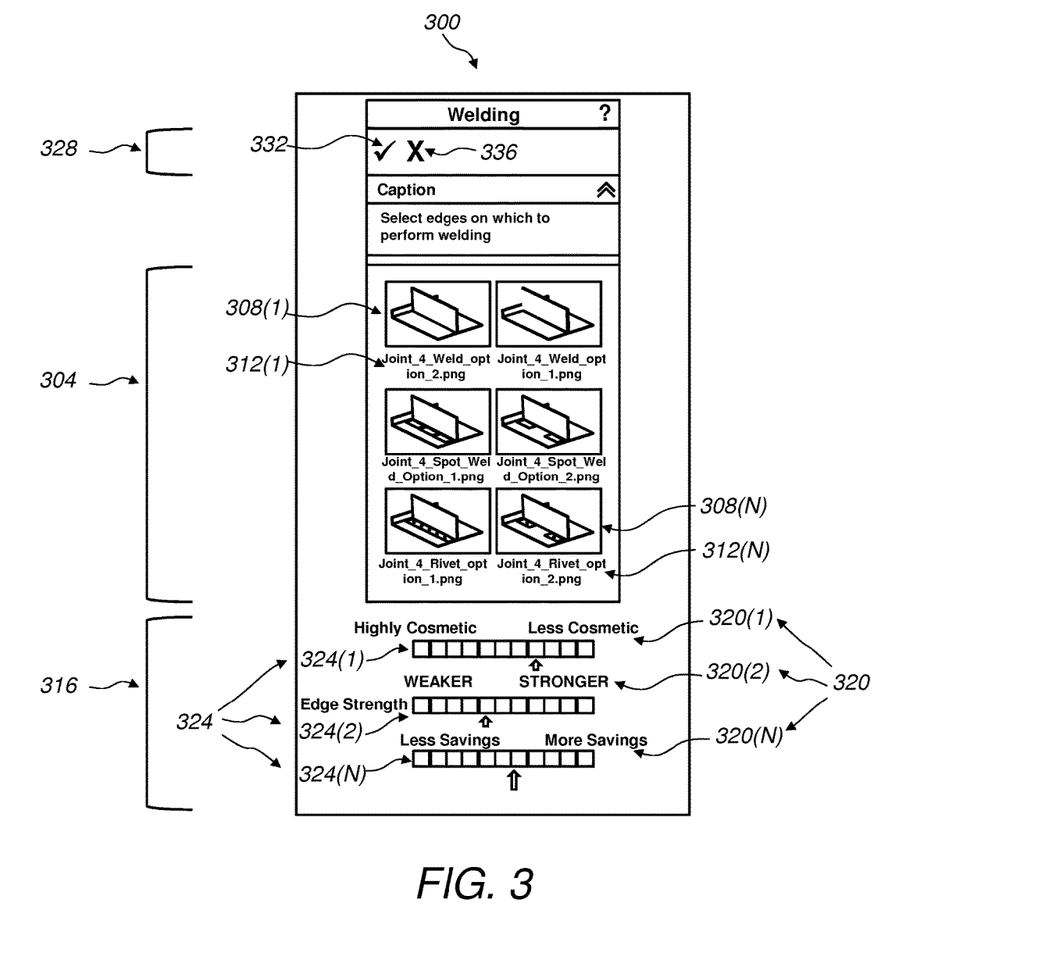
FIG. 3 is a screenshot of a display window of a particular instantiation of the joining data determining and selecting system of FIG. 1, after joining data to recommend has been determined.

FIG. 3 illustrates an exemplary screen display window 300 for conveying recommended joining data. Window 300 may be implemented in system 132 and/or displayed at step 225 of method 200 as a means to present recommended joining data 104. Window 300 includes a panel 304 that conveys one or more recommended joining methods 308(1) to 308(N) based on recommended joining data 104, which are determined by joining recommendation algorithm 156. For example, each recommended joining method 308(1) to 308(N) may include a textual and/or a graphical depiction of the joining method, which empowers the user with manufacturing knowledge and guidance (i.e. visually depicted lists of all possible/recommended joining types presents the user with options they may not have known existed or may have otherwise overlooked or undervalued, such as being shown that in a given example, a rivet joining may be far stronger than a seam weld, correcting the user's previous impressions of poor riveting strength, thereby teaching them) previously unavailable while working with computer models of structures.

In this example, optional window 300 further includes a panel 316 that conveys one or more joining characteristics 320 for ones of the recommended joining methods 308(1) to 308(N). For illustrative purposes, panel 316 includes information about the cosmetic appearance, strength, and cost of ones of the recommended joining methods 308(1) to 308(N). In one embodiment, each joining characteristic 320 includes a control 324 for conveying quantitative and/or qualitative information regarding the characteristic 320 which further empowers the user with the ability to compare manufacturing knowledge across recommended joining methods.

The one or more recommended welding methods 308(1) to 308(N) may be selectable by the user. When the user selects a recommended joining method 308(N) displayed in panel 304, information for one or more joining characteristics 320(1) to 320(N) associated with the selection is displayed in panel 316. This feature enables users to quickly toggle between the one or more recommended welding methods 308(1) to 308(N) and compare the one or more joining characteristics 320(1) to 320(N).

Window 300 further includes a panel 328 that enables the user to signal software 136 regarding recommended joining data 104 and/or recommended joining method(s) 308 that may or may not be associated with the model. Panel 328 includes a confirmation button 332 that enables the user to signal software 136 that ones of the recommended joining methods 308(1) to 308(N) are to be associated with the model. For example, upon selection of the confirmation button 332, software 136 may execute step 240 of FIG. 2, at which the system may display a window, such as window 400 of FIG. 4, for use in displaying information for one or more characteristics associated with the selected or recommended joining data 142 to the user. Panel 328 further includes a cancellation button 336 that enables the user to signal software 136 that ones of the recommended joining methods 308(1) to 308(N) are not to be associated with the computer model 116.

Figure 4:
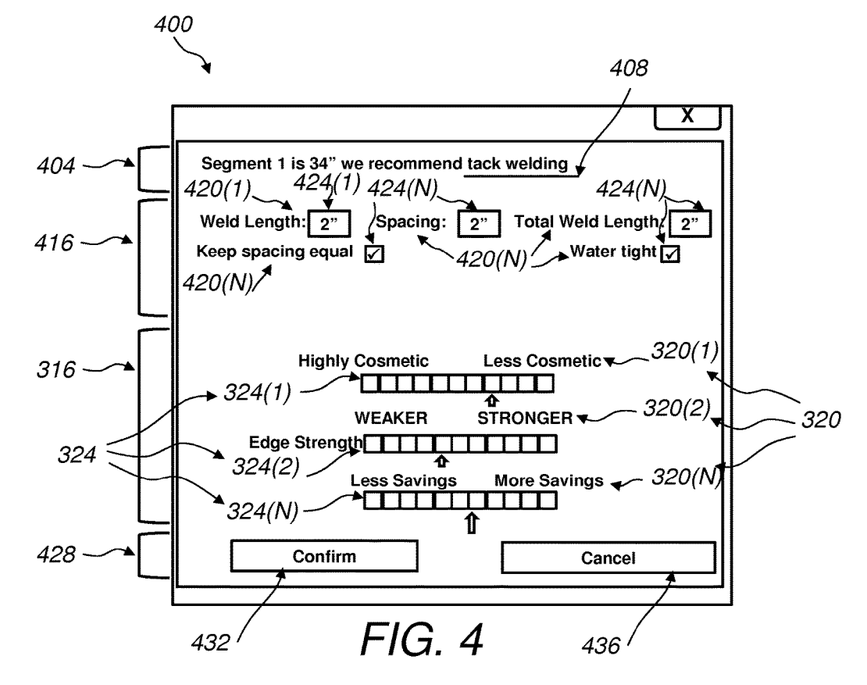
FIG. 4 is a screenshot of a display window of a particular instantiation of the joining data determining and selecting system of FIG. 1, after joining data to recommend has been determined.

FIG. 4 is an exemplary optional screen display window 400 of software 136 (FIG. 1), in which recommended joining data 104 is graphically conveyed to the user. Window 400 may be optionally displayed to the user at step 240 of method 200 (FIG. 2) after confirming a joining method in window 300, or as a result of the automatic method of recommendation and presentation. Window 400 may be displayed in order to give more information to the user about the joining they have been recommended and/or have selected and to continue the recommendation and presentation process, as well as to gather additional information about the joining from the user if it is necessary or desirable. Window 400 includes a panel 404 that conveys information regarding the input joining data 120 that joining recommendation algorithm 156 used to determine recommended joining data 104. For example, panel 404 may convey a geometric calculation of the structure 112 and recommend a joining method 408 based on the geometric calculation.

Window 400 also includes a panel 416 that includes one or more controls for conveying recommended joining data 104 determined by joining recommendation algorithm 156. For example, controls 420(1) to 420(N) may convey quantitative and/or qualitative joining parameter values 424(1) to 424(N) associated with the joining method 408. Controls 420(1) to 420(N) may enable the user to modify one or more of the recommended joining parameter values 424(1) to 424(N).

Window 400 further includes panel 316 FIG. 3) which will serve the function of displaying information for one or more characteristics 320(1) to 320(N) (FIG. 3) associated with the selected joining data 142. This panel displays this information through the use of selection description widgets 324(1) to 324(N) (FIG. 3) which will convey quantitative and/or qualitative information regarding characteristics 320 (1) to 320(N) associated with the selected joining data 142. Note that the quantitative and/or qualitative information displayed in selection description widgets 324(1) to 324(N) may automatically update as the user modifies quantitative and/or qualitative joining parameter values 424(1) to 424 (N), providing an additional level of specificity to the user regarding the selected joining method 142.

Window 400 also includes a panel 428 that enables the user to signal software 136 regarding recommended joining data 104 that may or may not be associated with the model. Panel 428 includes a confirmation button 432 that enables the user to signal software 136 that the joining method 408 and quantitative and/or qualitative joining parameter values 424(1) to 424(N) are to be associated with the model. For example, upon selection of the confirmation button 432, software 136 may execute step 240 of FIG. 2, making the association between the selected joining data 142 and the computer model 116. Panel 428 further includes a cancellation button 436 that enables the user to signal software 136 that the joining method 408 and quantitative and/or qualitative joining parameter values 424(1) to 424(N) are not to be associated with the computer model 116.

Exemplary Computing Device

As noted above aspects and embodiments described herein may be conveniently implemented using one or more machines (e.g., one or more computing devices/computer systems that are part of a join-recommending system 100 of FIG. 1), including hardware and special programming according to the teachings of the present specification, as will be apparent to those of ordinary skill in the computer arts. Appropriate software coding can readily be prepared by skilled programmers based on the teachings of the present disclosure, as will be apparent to those of ordinary skill in the software arts.

Such software may be, for example, a computer program product that employs one or more machine-readable hardware storage mediums. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable hardware storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. Such a data signal or carrier wave would not be considered a machine-readable hardware storage medium. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a computer workstation, a terminal computer, a server computer, a handheld device (e.g., tablet computer, a personal digital assistant "PDA", a mobile telephone, etc.), a web appliance, a network router, a network switch, a network bridge, any machine capable of executing a sequence of instructions that specify an action to be taken by that machine, and any combinations thereof.

Figure 5:
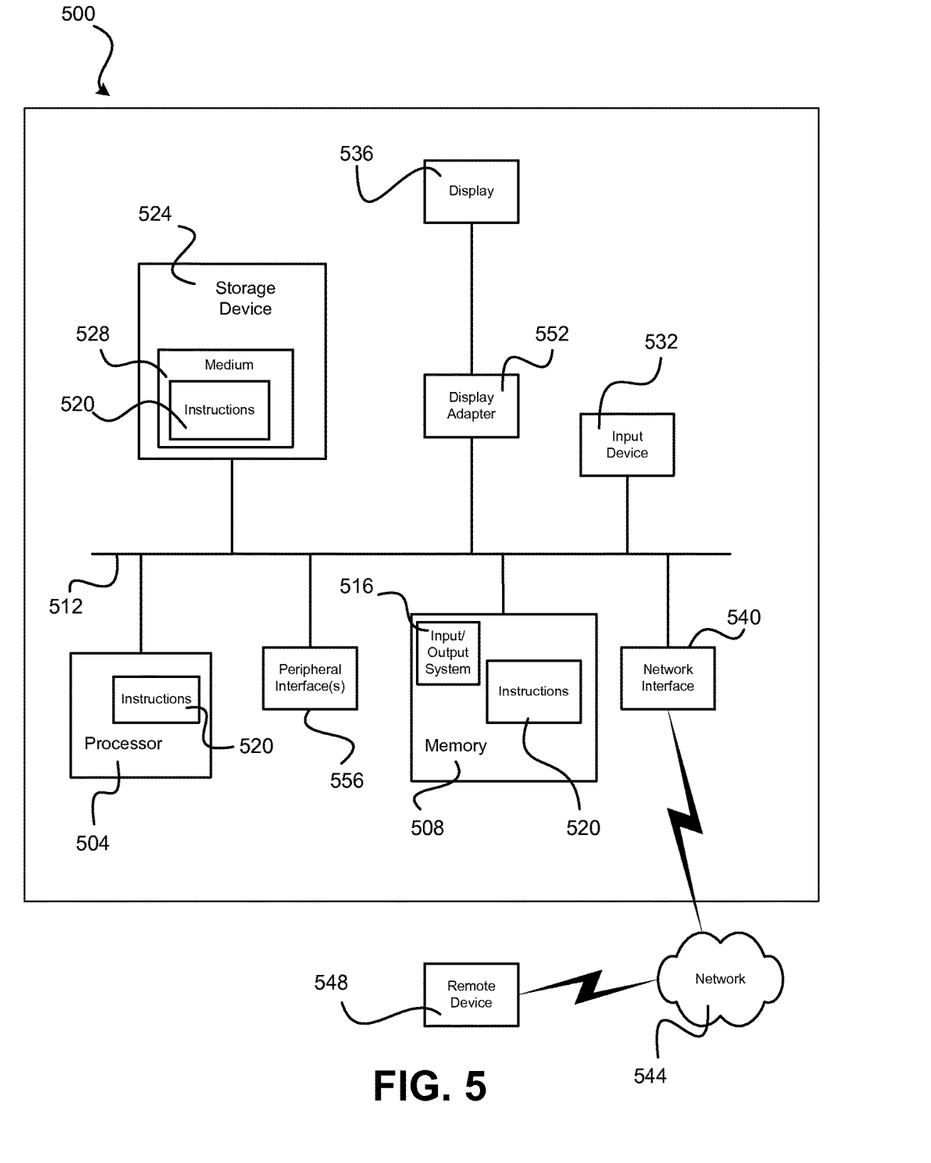
FIG. 5 is a high-level block system diagram depicting one example embodiment of a hardware platform which may be used to host and run the method and associated software.

FIG. 5 shows a diagrammatic representation of one exemplary embodiment of a computing device 500, within which a set of instructions for causing one or more processors 504 to perform any one or more of the functionalities, aspects, and/or methodologies of the present disclosure. It is also contemplated that multiple computing systems may be utilized to implement a specially configured set of instructions for performing any one or more of the functionalities, aspects, and/or methodologies of the present disclosure in a distributed computing matter.

Computing device 500 can also include a memory 508 that communicates with the one or more processors 504, and with other components, for example, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable hardware storage media) including, but not limited to, a random access memory component (e.g., a static RAM "SRAM", a dynamic RAM "DRAM", etc.), a read only component, and any combinations thereof. In one example, a basic input/output system 516 (BIOS), including basic routines that help to transfer information between elements within computing system 500, such as during start-up, may be stored in memory 508. Memory 508 may also include (e.g., stored on one or more machine-readable hardware storage media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computing device 500 may also include a storage device 524, such as, but not limited to, the machine readable hardware storage medium described above. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computing system 500 (e.g., via an external port connector (not shown)). Particularly, storage device 524 and an associated machine-readable medium 528 may provide nonvolatile and/or volatile storage of machine-readable instructions, data structures, program modules, and/or other data for computing device 500. In one example, software instructions 520 may reside, completely or partially, within machine-readable hardware storage medium 528. In another example, software instructions 520 may reside, completely or partially, within processors 504.

Computing device 500 may also include an input device 532. In one example, a user of computing system 500 may enter commands and/or other information into computing system 500 via one or more input devices 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touch screen, and any combinations thereof. Input device(s) 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device(s) 532 may include a touch screen interface that may be a part of or separate from display(s) 536, discussed further below. Input device(s) 532 may be utilized as a user selection device for selecting one or more graphical representations in a graphical interface as described above.

A user may also input commands and/or other information to computing device 500 via storage device 524 (e.g., a removable disk drive, a flash drive, etc.) and/or network interface device(s) 540. A network interface device, such as any one of network interface device(s) 540, may be utilized for connecting computing system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network, a telephone network, a data network associated with a telephone/voice provider, a direct connection between two computing devices, and any combinations thereof. A network, such as network 544, may employ a wired and/or a wireless mode of communication. In general, any network topology may be used. Information (e.g., data, software instructions 520, etc.) may be communicated to and/or from computing system 500 via network interface device(s) 540.

Computing device 500 may further include one or more video display adapter 552 for communicating a displayable image to one or more display devices, such as display device(s) 536. Examples of a display device include, but are not limited to, a liquid crystal display (LCD), a cathode ray tube (CRT), a plasma display, a light emitting diode (LED) display, and any combinations thereof. Display adapter(s) 552 and display device(s) 536 may be utilized in combination with processor(s) 504 to provide a graphical representation of a utility resource, a location of a land parcel, and/or a location of an easement to a user. In addition to a display device, computing system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a THUNDERBOLT connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Additionally, although the methods herein have been illustrated as being performed in a specific order, the ordering is highly variable within ordinary skill to achieve the spot welding placement and display methods, systems, and software described herein. Accordingly, this description is meant to be taken only by way of example, and not to otherwise limit the scope of this invention.

What is claimed is:

1. A method of assisting a user in selecting a join for a structure represented in a computer model, the method comprising:
   receiving, via a join-recommending system, a join request for joining two structures with a weld;
   receiving, via the join-recommending system, input joining data, the input joining data including characteristics of the two structures, the characteristics including material type, geometry, and weld location;
   generating, within the join-recommending system and in response to said receiving the join request, a recommended joining data as a function of the input joining data, the recommended joining data including at least tow different weld types, the generating step including calculating, based on the input joining data, a joint strength and manufacturing cost for each of the at least two weld types;
   presenting the recommended joining data to the user via a join-recommendation user interface, the interface including a panel for displaying the at least two different weld types and a panel for displaying the calculated joint strength and manufacturing cost for each of the at least two different weld types;
   receiving via the join-recommendation user interface a user selection of the recommended joining data so as to create selected joining data; and
   automatedly associating the selected joining data with the computer model.

2. A method according to claim 1, wherein said receiving input joining data includes extracting input joining data from the computer model.

3. A method according to claim 2, wherein said receiving input joining data further includes receiving input joining data from the user via an input-joining-data user interface.

4. A method according to claim 1, wherein said receiving input joining data includes receiving input joining data from the user via an input-joining-data user interface.

5. A method according to claim 1, wherein the recommended joining data further includes finish type, and said presenting the recommended joining data includes displaying the finish type to the user.

6. A method according to claim 1, wherein said displaying the joining characteristics further includes displaying joining characteristics of at least one non-weld join.

7. A method according to claim 6, wherein said receiving the user selection of the recommended joining data includes receiving a user selection of one of the at least two weld type or one of the at least one non-weld join.

8. A method according to claim 1, wherein said presenting joining data includes displaying, on the join-recommendation user interface, graphical depictions of the at least two weld types.

9. A method according to claim 8, further comprising receiving a user pre-selection of one of the plurality of at least two weld types and, in response to the user pre-selection, displaying a set of joining characteristics for the pre-selected one of the at least two weld types.

10. A method according to claim 1, wherein said automatedly associating the selected joining data with the computer model includes adding the selected joining data to the computer model so that displaying of the computer model includes displaying a join corresponding to the selected joining data.

11. A method according to claim 1, wherein said displaying the at least two different weld types includes displaying a graphical depiction of the at least two different weld types.

12. A method according to claim 11, wherein said displaying the at least two different weld types further includes displaying at least one qualitative joining characteristic.

13. A method according to claim 8, wherein said presenting further includes displaying on the panel of the join-recommendation user interface a cosmetic value associated with each of the at least two weld types.

14. A method according to claim 13, wherein said presenting further includes displaying on the panel of the join-recommendation user interface, at least one selection description widget configured to display at least one of joint strength, manufacturing cost, or cosmetic value for each of the at least two weld types on a relative scale for comparison.

* * * * *